United States Patent
Shao et al.

(10) Patent No.: US 8,458,524 B2
(45) Date of Patent: Jun. 4, 2013

(54) FIRMWARE RECOVERY SYSTEM AND METHOD

(75) Inventors: Wei Shao, Shenzhen (CN); Le Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 394 days.

(21) Appl. No.: 12/982,886

(22) Filed: Dec. 31, 2010

(65) Prior Publication Data
US 2012/0110379 A1 May 3, 2012

(30) Foreign Application Priority Data
Oct. 27, 2010 (CH) .................. 2010 1 0521625

(51) Int. Cl.
*G06F 11/00* (2006.01)
(52) U.S. Cl.
USPC ............................................................ 714/36
(58) Field of Classification Search
USPC ..................... 714/36; 713/1, 2, 100
See application file for complete search history.

(56) References Cited

U.S. PATENT DOCUMENTS

| 7,552,217 B2 * | 6/2009 | Mihm et al. ................. 709/227 |
| 7,809,836 B2 * | 10/2010 | Mihm et al. ................. 709/227 |
| 7,849,454 B2 * | 12/2010 | Lambert et al. .............. 717/168 |
| 8,386,764 B2 * | 2/2013 | Li et al. ......................... 713/100 |
| 2006/0101310 A1 * | 5/2006 | Diamant et al. ................ 714/38 |
| 2007/0174705 A1 * | 7/2007 | Shih ............................... 714/36 |
| 2007/0234123 A1 * | 10/2007 | Shih et al. ..................... 714/36 |

* cited by examiner

*Primary Examiner* — Philip Guyton
(74) *Attorney, Agent, or Firm* — Altis Law Group, Inc.

(57) ABSTRACT

A firmware recovery system includes a baseboard management controller (BMC) module, a south bridge, a basic input and output system (BIOS) module, a multiplexer and a storage module. The BIOS module is connected to the BMC module by the south bridge and determines whether a firmware file of the BMC module is corrupt. The multiplexer selectively connects the BIOS module or the BMC module to the south bridge. The storage module stores a new firmware file. When the firmware file of the BMC module is corrupt, the BIOS module controls the multiplexer to select the BMC module to connect to the south bridge. The BIOS module reads the new firmware file from the storage module to recover the corrupt firmware file from the BMC module.

14 Claims, 2 Drawing Sheets

FIRMWARE RECOVERY SYSTEM AND METHOD

BACKGROUND

1. Technical Field

The disclosure generally relates to firmware recovery systems, particularly to baseboard management controller (BMC) firmware recovery system and method.

2. Description of Related Art

Intelligent platform management interfaces (IPMI) are widely applied in computer system to monitor characteristics of a computer system, such as temperatures, voltages, power supply, and fan speed. A baseboard management controller (BMC) is a core feature of the IPMI. When firmware of the BMC is corrupt (e.g., damaged, missing information), it cannot support the BMC to start and realize these functions. A typical method to update the corrupt firmware of the BMC is based on an operating system (OS). BMC recovery programs must be preset in the OS to update the corrupt firmware.

Therefore, there is room for improvement within the art.

BRIEF DESCRIPTION OF THE DRAWINGS

Many aspects of the firmware recovery system and method can be better understood with reference to the following drawings. The components in the drawings are not necessarily drawn to scale, the emphasis instead being placed upon clearly illustrating the principles of the firmware recovery system and method.

DETAILED DESCRIPTION

Figure 1:
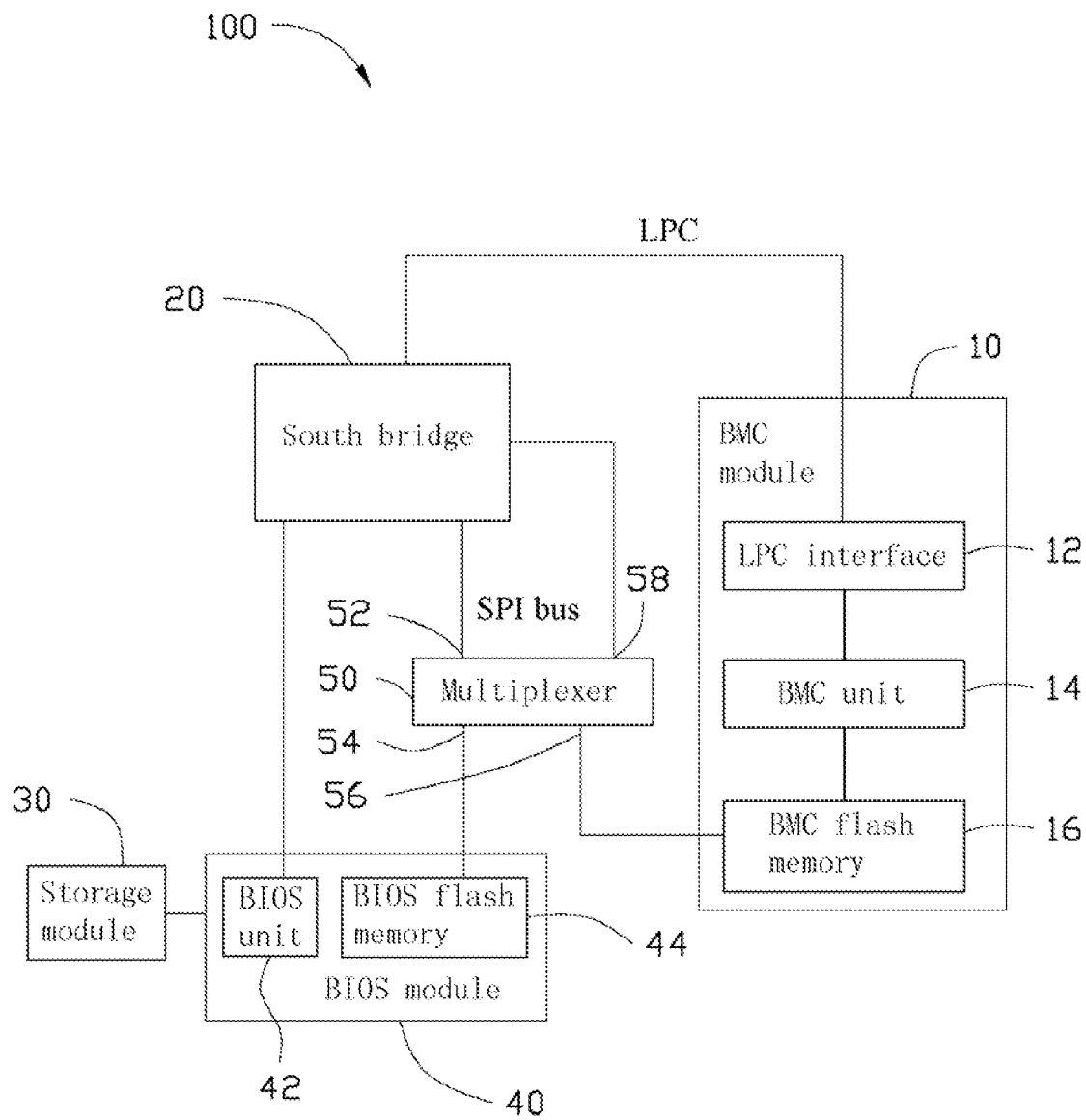
FIG. 1 is a block diagram of a firmware recovery system, according to an exemplary embodiment.

FIG. 1 shows a firmware recovery system 100, according to an exemplary embodiment. The firmware recovery system 100 includes a BMC module 10, a south bridge 20, a storage module 30, a basic input and output system (BIOS) module 40 and a multiplexer 50.

The BMC module 10 includes a Low pin count (LPC) interface 12, a BMC unit 14, and a BMC flash memory 16 connected in series. The LPC interface 12 is connected to the south bridge 20 by LPC buses. The BMC flash memory 16 stores firmware files to drive and support the BMC unit 14 to work normally.

The south bridge 20 is connected between the BMC module 10 and BIOS module 40. Thus, the BMC module 10 and the BIOS module 40 can communicate with each other by the south bridge 20. The south bridge 20 is also connected to the multiplexer 50. The BIOS module 40 controls the multiplexer 50 through the south bridge 20.

The storage module 30 may be a hard disk, a compact disc (CD) read-only memory (ROM) or a USB flash memory, new firmware files can be prestored in the storage module 30 for the BMC module 10.

The BIOS module 40 includes a BIOS unit 42 and a BIOS flash memory 44. The BIOS unit 42 is directly connected to the LPC interface 12 by the south bridge 20. The BIOS flash memory 44 is selectively connected to the multiplexer 50. The BIOS flash memory 44 stores BIOS programs for driving the BIOS unit 42 to start and work.

The multiplexer 50 includes an input terminal 52 and a first output terminal 54, a second output terminal 56 and a control terminal 58. The input terminal 52 is connected to the south bridge 20 by serial peripheral interface (SPI) buses. The two output terminals 54 are respectively selectively connected to the BIOS flash memory 42 and the BMC flash memory 16. The control terminal 58 is connected to the south bridge 20. When the control terminal 58 receives a first control signal from the BIOS unit 42 by the south bridge 20, the BMC flash memory 16 is selected to connect to the input terminal 52 by the first output terminal 54. When the control terminal 58 receives a second control signal from the BIOS unit 42 by the south bridge 20, the BIOS flash memory 44 is selected to connect to the input terminal 52 by the second output terminal 56. In this embodiment, the BIOS flash memory 44 is connected to the south bridge 20 as default.

Figure 2:
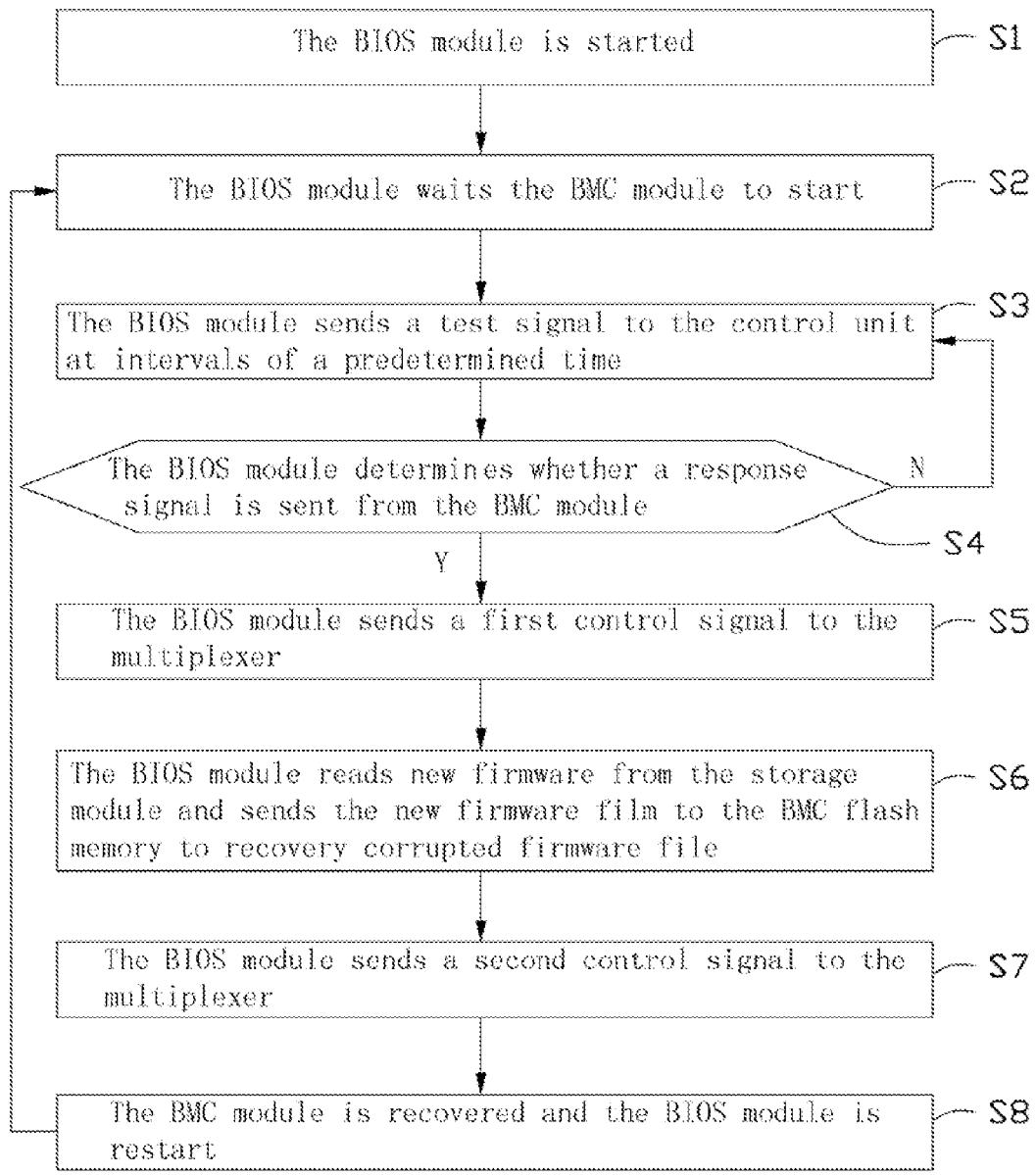
FIG. 2 is a flowchart of a firmware recovery process of one embodiment of the firmware recovery system of FIG. 1.

Referring to FIG. 2, the firmware recovery process of the firmware recovery system 100 may include following steps:

In step S1, as default, the BIOS flash memory 44 is connected to the south bridge 20. The BIOS module 40 is started by control of the south bridge 20 and a central processing unit CPU (not shown).

In step S2, the BIOS module 40 waits for a starting time. The BMC module 10 can be started during the starting time if the firmware file of the BMC flash memory 16 can be normally read and executed.

In step S3, the BIOS module 40 sends a test signal to the control unit 14 at intervals of a predetermined time. In this embodiment, the predetermined time is slightly longer than a sum of a starting time of BIOS module 40 and the start time of the BMC module 10.

In step S4, the BIOS module 40 determines whether firmware file of the BMC module is corrupt. If a response signal is sent from the BMC module 10 to the BIOS module 40 after sending the test signal to the BMC module 10 for a certain number of times such as three times. That means the firmware file of the BMC unit 14 can be executed and the BMC module 10 can be normally started, the process returns to the step S3, and the BIOS module 40 keeps monitoring the BMC module 10. If no response signal is sent from the BMC module 10 to the BIOS module 40 after sending to the test signal to the BMC module 10 for a certain number of times such as three times, that means the firmware file of the BMC module 10 is corrupt, and the process goes to step S5.

In step S5, the BIOS module 40 sends a first control signal to the multiplexer 50 by the south bridge 20. Thus, the BMC flash memory 16 is selected to connect to the south bridge 20.

In step S6, the BIOS module 40 reads new firmware from the storage module 30 and sends the new firmware to the BMC flash memory 16 by the south bridge 40 and the multiplexer 50. The corrupt firmware in the BMC flash memory 16 can be updated and can be recovered by the new firmware.

In step S7, the BIOS unit 40 sends a second control signal to the multiplexer 50 by the south bridge 20. Thus, the BIOS flash memory 44 is selected to connect to the south bridge 20.

In step S8, the BMC module 10 is recovered by the new firmware and the BIOS module 40 can be reset, the process returns to the step S2.

In other embodiments, the BIOS module 40 can stop sending test signals to the control unit 14 when the firmware recovery system 100 is in step S8 to save resources.

The firmware recovery system 100 uses the BIOS module 40 to send the new firmware file to update the BMC module 10 when the firmware file is corrupt. The recovery process is simple and does not need any other recovery programs.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A firmware recovery system; comprising:
   a baseboard management controller (BMC) module comprising a firmware file;
   a south bridge;
   a basic input and output system (BIOS) module connected to the BMC module by the south bridge and determining whether the firmware file of the BMC module is corrupt;
   a multiplexer selectively connecting the BIOS module or the BMC module to the south bridge; and
   a storage module storing a new firmware file; wherein when the firmware file of the BMC module is corrupt, the BIOS module controls the multiplexer to select the BMC module to connect to the south bridge, the BIOS module reads the new firmware file from the storage module to recover the corrupt firmware file of the BMC module.

2. The firmware recovery system as claimed in claim 1, wherein if a response signal is sent from the BMC module to the BIOS module after a test signal is sent to the BMC module for a certain number of times, the BIOS module determines that the firmware file of the BMC module is normal.

3. The firmware recovery system as claimed in claim 1, wherein if no response signal is sent from the BMC module to the BIOS module after a test signal is sent to the BMC module for a certain number of times, the BIOS module determines that the firmware file of the BMC module is corrupt.

4. The firmware recovery system as claimed in claim 1, wherein the BIOS module includes a BIOS unit and a BIOS flash memory connected to the multiplexer; the BIOS unit is connected to the south bridge and the storage module, the BIOS unit controls the multiplexer to select the BMC module to the south bridge, and reads the new firmware from the storage module to recover the corrupted firmware of the BMC module.

5. The firmware recovery system as claimed in claim 4, wherein the BMC module includes a BMC unit and a BMC flash memory connected to the BMC module, the BMC unit communicates with the BIOS unit by the south bridge, the BMC flash memory stores the firmware file.

6. The firmware recovery system as claimed in claim 5, wherein the multiplexer includes a input terminal connected to the south bridge, a control terminal connected to the south bridge, a first output terminal and second output terminal selectively connected to the BIOS flash memory and the BMC flash memory; the BIOS unit controls the multiplexer to select the BIOS flash memory or the BMC flash memory to connect to the south bridge by the control terminal.

7. The firmware recovery system as claimed in claim 3, wherein the BMC module further includes a low pin count interface connecting the BMC module to the south bridge.

8. The firmware recovery system as claimed in claim 1, wherein the storage module is a hard disk, a compact disc read-only memory, or a USB flash memory.

9. A firmware recovery method, comprising:
   providing a firmware recovery system which includes a BMC module comprising a firmware file, a south bridge, a BIOS module connected to the BMC module by the south bridge, a multiplexer selectively connecting the BIOS module or the BMC module to the south bridge and a storage module storing new firmware;
   the BIOS module determining whether the firmware file of the BMC module is corrupt;
   the BIOS module controlling the multiplexer to select the BMC module to the south bridge and reading a new firmware from the storage module to recover the corrupt firmware file of the BMC module when the BIOS module determines that the firmware file of the BMC module is corrupt.

10. The firmware recovery method of claim 9, further comprising waiting for the BMC module to start before determining whether firmware file of the BMC module is corrupt.

11. The firmware recovery system as claimed in claim 9, wherein if a response signal is sent from the BMC module to the BIOS module after sending a test signal to the BMC is sent module for a certain number of times, the BIOS module determines that the firmware file of the BMC module is normal.

12. The firmware recovery system as claimed in claim 9, wherein if no response signal is sent from the BMC module to the BIOS module after sending a test signal is sent to the BMC module for a number of certain times, the BIOS module determines that the firmware file of the BMC module is corrupt.

13. The firmware recovery method as claimed in claim 9, further comprising controlling the multiplexer to select the BIOS module to connect to the south bridge.

14. The firmware recovery method as claimed in claim 13, further comprising restarting the BIOS module after recovery of the BMC module and returning to wait for the BMC module to start.

* * * * *